April 23, 1935.  H. FORD  1,998,613

ENGINE CLUTCH

Filed March 17, 1933

INVENTOR.
Henry Ford
BY
ATTORNEY.

Patented Apr. 23, 1935

1,998,613

UNITED STATES PATENT OFFICE 1,998,613

ENGINE CLUTCH

Henry Ford, Dearborn, Mich., assignor to Ford Motor Company, Dearborn, Mich., a corporation of Delaware Application March 17, 1933, Serial No. 661,229

13 Claims. (Cl. 192—69)

The object of my invention is to provide an engine clutch especially adapted for transmitting the driving torque in connection with motor vehicles. My improved clutch functions in the same manner as does the conventional disc-type clutch; however, certain advantages are inherent with my improved clutch, which advantages are not believed attainable with any type of clutch heretofore available for motor vehicles.

More specifically, the object of this invention is to provide an operable clutch in which the end thrust, due to disengaging the clutch, is resisted entirely by means other than the engine crankshaft and in which the friction member or disc which is connected to the driven shaft is of exceptionally light weight to thereby permit the use of a sliding gear transmission with my clutch. A clutch incorporating both of these features has not heretofore been available and consequently in every former installation known to the applicant, either one or both of these desirable characteristics were absent. It may be well to keep in mind that the present-day automobile would be materially benefited by a clutch wherein the end thrust upon the crankshaft was eliminated and wherein the driven clutch plates had a negligible inertia to thereby insure quiet operation of a selective gear-type transmission in connection therewith.

As my improved clutch is of the friction-disc type it may be well to mention some of the characteristics inherent in this type of clutch. Such clutches invariably have one or more comparatively light weight plates which are operatively clamped between a pair of heavy plates. These heavy plates comprise the end plates of the clutch and, as far as the clutching action is concerned, may be either the driving plates or the driven plates. However, these end plates must be exceptionally rigid in order to uniformly grip the intermediate plates around their full peripheries upon the application of an axial load impressed at only a few points around the peripheries of the heavy discs. If such end plates are not rigid axial distortion will occur which prevents uniform gripping action and thereby lessens the torque capacity of the clutch. For this reason disc clutches invariably have at least one light disc, usually lined with a high coefficient lining, which is operatively clamped between a pair of heavy cast-iron discs or end plates. The end plates are invariably made of metal to both rapidly conduct the heat away from the clutch facings and to give sufficient rigidity to insure uniform clutching engagement around their full peripheries. Further, the fingers, toggles, or whatever mechanism is employed to actuate the plates, must coact with the end plates of the clutch and as these are the heavy plates the inertia of these operating parts is added to the already comparatively heavy group of plates.

The foregoing has been brought out to show that only one group of the clutch plates in disc clutches may be constructed with comparatively little inertia.

For use in automobiles, it has been customary to mount such clutches within the flywheel of the associated engine so that the flywheel could be used as one of the heavy clutch plates. Consequently, the heavy plates were the driving plates of the clutch. This arrangement was particularly advantageous where a selective gear transmission was to be used in the vehicle. Of course, as far as the actual operation of the clutch is concerned identically the same gripping action, operation and other characteristics of the clutch are obtained, irrespective of whether or not the driving plates and throw-out mechanisms are associated with the flywheel or the driven shaft of the clutch. However, when such clutch is used with a selective gear transmission, then it becomes highly important that the light weight clutch plates be connected to the transmission shaft.

As is well known, in changing from one speed to another with a selective gear type transmission or any positive clutching transmission having fixed speed ratios therein, it is necessary that the driven clutch plates be accelerated or decelerated during the short interval between the disengagement of one speed and engagement of the next. If the parts associated with the driven shaft of the clutch or driving shaft of the transmission have almost negligible inertia then the shift from one speed to any other can be accomplished without noise or strain upon the gear teeth or transmission mechanism. The ultimate obtainable in this respect results when the driven clutch members are formed as relatively thin flexible discs which are adapted to be clamped between relatively heavy rigid driving members. Inasmuch as the driven discs, at best, must have sufficient strength to transmit the engine torque they have at least some inertia to thereby cause a grinding noise or screeching in the transmission if the relative speeds of the driven disc and transmission are not properly synchronized. To eliminate such grinding noise and allow quick shifting of the transmission, frictional synchronizing devices are now quite commonly used, which synchronizers change the speed of the driven discs during a short interval instead of instantaneously, as is attempted in the conventional sliding gear transmission. It is very important that the clutch discs to be synchronized have little inertia as synchronizers restrict the ease of manually shifting the transmission and if the heavy discs are to be synchronized the power required to operate the synchronizer would unduly retard the shifting of the transmission by the driver of the vehicle.

From the foregoing it will readily be seen that where selective gear transmissions are to be used, either with or without synchronizing devices, it is essential that the clutch plates which are connected with the transmission have very little inertia. This is accomplished only by driving the heavy plates directly by the engine, usually within the engine flywheel.

While the above mentioned arrangement is advantageous from a transmission standpoint, nevertheless is objectionable for the reason that the end thrust resulting from the operation of disengaging the clutch is invariably resisted by thrust bearings upon the engine flywheel or crankshaft to which the flywheel is secured. The fingers, toggles or other members which actuate such driving plates exert an axial thrust upon the plates equal to the axial pressure required to operate the fingers. If such end thrust could be resisted by ball or roller thrust bearings, little damage would result; however, due to the construction of most automobile engine crankshafts, ball thrust bearings cannot be installed thereon so that the flywheel flange on the crankshaft usually forms the thrust bearing for absorbing the end thrust on the shaft.

Further, certain automobile engines are equipped with crankshafts having main bearings of between five and six inches in diameter, as shown in the attached drawing, and when such bearings are provided it becomes necessary to provide a thrust bearing of approximately six inches in diameter. Such a large thrust bearing when operated at high engine speeds usually gives considerable trouble. Consequently, the clutch shown herein wherein the end thrust is resisted by the transmission through the driving shaft is especially adapted for use with the engine shown herein, as a small diameter ball-type thrust bearing may readily be provided for resisting the end thrust incidental to throwing out the clutch.

It is not contended by the applicant that he has devised the first clutch in which the end thrust was resisted by means of ball bearings, for in several clutches known to the applicant the end thrust is absorbed by the driven or transmission shaft of the vehicle through ball bearings. However, in all such installations the heavy plates are invariably connected to the transmission shaft, as are their operating fingers. Consequently, such clutches have a limited commercial application in connection with selective gear transmissions for the reason that the throw-out mechanism and associated heavy plates of this type of clutch invariably have many times the maximum permissible inertia that may be conveniently overcome by the use of synchronizers in the modern automobile.

The clutch about to be described is of the oil type with the clutch facings and clutch springs proportioned to give the desired torque transmission when operating in oil. However, the novel features incorporated therein are equally well adapted for use on dry-type clutches. Further, other shapes of driven clutch members may be provided, as the invention herein is primarily a clutch wherein the thrust of the throw-out bearing is resisted by the driven shaft and wherein the clutching member associated with the driven shaft has a low inertia.

With these and other objects in view, my invention consists in the arrangement, construction and combination of the various parts of my improved device, as described in my specification, claimed in my claims, and illustrated in the accompanying drawing, in which:

Figures 1, 2, 3, 4:
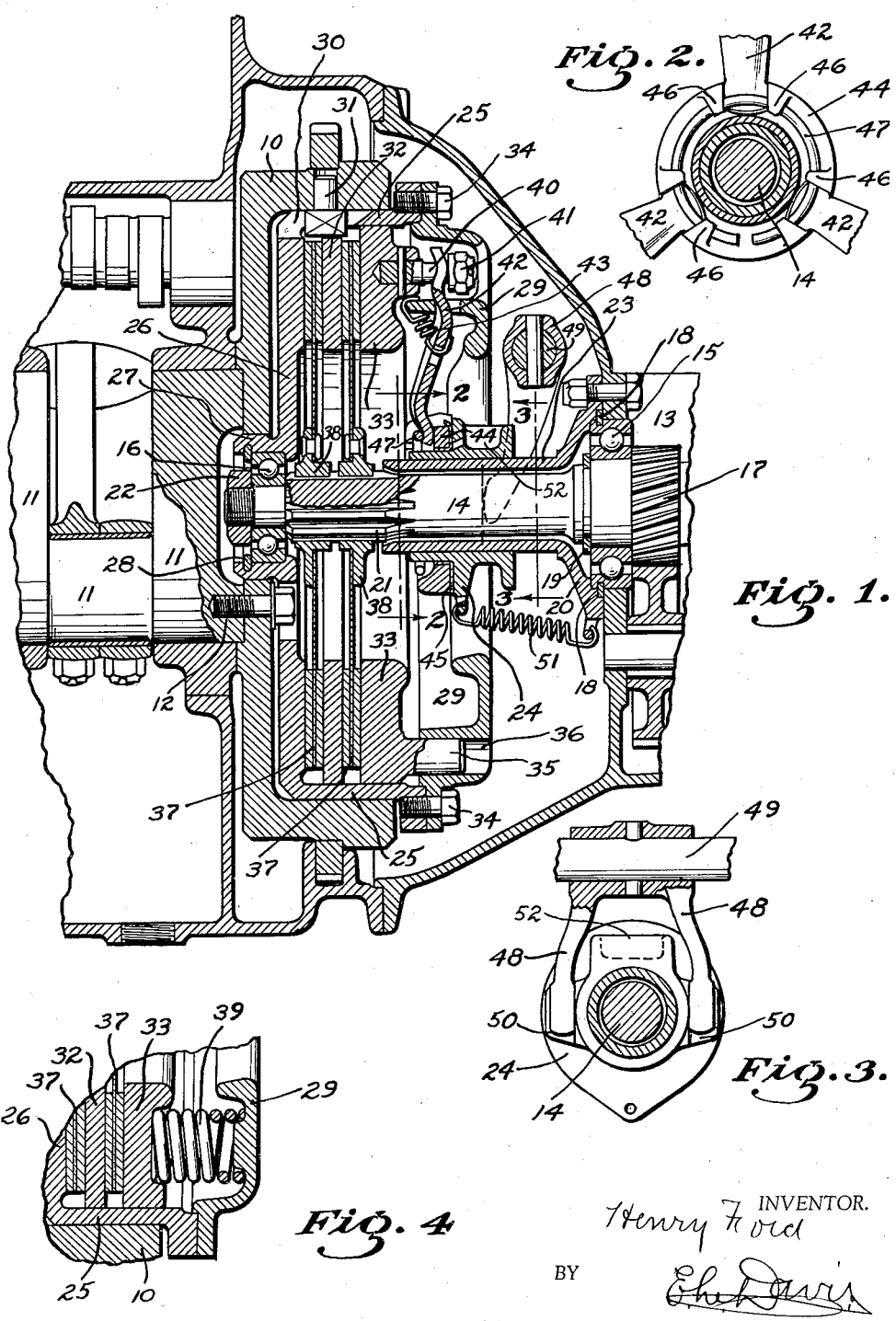
Figure 1 shows a vertical central sectional view through my improved clutch, in position installed in an engine flywheel.
Figure 2 shows a sectional view, taken on the line 2—2 of Figure 1.
Figure 3 shows a sectional view, taken on the line 3—3 of Figure 1.
Figure 4 shows a fragmentary sectional view through one of the clutch springs, illustrating the construction.

Referring to the accompanying drawing, I have used the reference numeral 10 to indicate the flywheel of a vehicle engine, which flywheel is bolted rigidly to the end of a crankshaft 11 by means of a plurality of cap screws 12. The rim of the flywheel 10 is of a substantial width and the web of the flywheel intersects this rim adjacent to the crankshaft side thereof whereby the flywheel is formed with a conventional cup-shaped recess in its rearmost face in which my improved clutch unit is adapted to be secured.

As this clutch unit is particularly adapted for use in motor vehicles having a selective gear type transmission, I have shown such a transmission at 13. A driven shaft 14 is rotatably mounted upon a ball bearing assembly 15 in the forward face of the transmission in axial alignment with the crankshaft 11. The forward end of the driven shaft 14 projects through a concentric opening in the flywheel 10 where it is rotatably supported by means of a second ball bearing 16.

From Figure 1 it will be noted that a gear 17 is formed upon the rearmost end of the shaft 14, within the transmission 13, and that a snap ring 19 is secured in a suitable annular groove in the shaft 14 whereby the bearing 15 is secured to the shaft 14. Likewise, a snap ring 18 is sprung into an annular groove in the periphery of the bearing 15, which ring is secured in position by means of a cover plate 20, this plate being secured on the forward face of the transmission 13. Thus the shaft 14, although rotatably mounted in the transmission 13, is prevented from axial movement in either direction relative thereto by means of the ball bearing 15. However, a limited axial clearance is provided between the forward end of the shaft 14 and the crankshaft 11 whereby the crankshaft 11 and flywheel 10 may float axially relative to the shaft 14.

That portion of the shaft 14 just rearwardly of the bearing 16 is somewhat larger than the portion within the bearing and is provided with a plurality of spline teeth 21 machined therein. A nut 22 is threaded upon the extreme forward end of the shaft 14 and retains the bearing 16 in fixed position upon the shaft.

It will be noted that the cover 20 is formed integrally with a sleeve 23 which extends forwardly around the shaft 14 to position adjacent to the spline teeth 21. However, ample clearance between the shaft 14 and sleeve 23 is provided so that no friction between these two elements can occur. The sleeve 23 serves as a guide upon which a clutch throw-out bearing 24 may reciprocate and as neither the throw-out bearing nor sleeve rotates at any time, the wear between these two members is negligible.

The friction elements of my improved clutch comprise a ring 25 which is reciprocally mounted within the rim of the flywheel 10, this ring being of iron and cast integrally with a cast-iron plate 26 and a hub 27. It will be noted that the hub 27 is centered in an axial opening in the flywheel web so as to permit a limited relative axial movement between these two elements. The hub 27 is also provided with an opening therethrough which receives the bearing 16 and a snap ring 28 is assembled into a suitable groove in this opening to prevent axial movement of the hub and ring relative to the shaft 14. Consequently, axial thrust upon the plate 26 will be resisted entirely by the transmission 13 through the bearings 15 and 16 and the shaft 14.

It will be noted that the periphery of the ring 25 is provided with a plurality of axially extending slots 30 machined therein which are adapted to coact with a plurality of square headed driving pins 31, these pins being secured in the periphery of the flywheel. The slots 30 permit the ring 25 to move axially relative to the flywheel while still transmitting a torsional drive to the ring from the flywheel. A second driving clutch plate 32 is mounted within the ring 25, the periphery of this clutch plate having suitable slots machined therein in position aligned with the slots 30 in the ring 25 whereby the heads of the pins 31 may extend through the ring 25 and into the slots in the clutch plate 32 to thereby convey a positive drive from the flywheel to both of the clutch plates 26 and 32.

It will be noted that the rearmost end of the ring 25 is outwardly flanged to receive a cover plate 29, this cover being fixedly secured in position by means of a plurality of screws 34. This cover plate has a relatively large central opening therethrough which allows free movement of the throw-out bearing 24 along the sleeve 23. An actuating clutch plate 33 is reciprocally mounted within the rearmost end of the ring 25, which clutch plate is formed with three pins 35 extending rearwardly therefrom. These pins are slidably received in three openings 36 in the cover 29 to be thus driven by the cover.

Disposed between the clutch plates 26 and 32 and between the plates 32 and 33, I have provided a pair of relatively light driven clutch discs 37, each having clutch facings secured to the respective sides thereof in the usual manner. Each of these clutch discs 37 is secured to a hub member 38 which hub members each have a splined opening therein corresponding to the splines 21 so that while the hubs are free to reciprocate axially upon the splines still the discs 37 convey the drive to the shaft 14.

A plurality of compression springs 39 are interposed between the cover 29 and the actuating plate 33, as shown in Figure 4, these springs being housed in three groups of three each, equally spaced around the periphery of the clutch. Suitable detents are formed in the cover to secure the springs in position around the periphery of the plate 33. From the foregoing it will be seen that, due to the constant stress of the springs 39, the clutch plate 33 will squeeze the driven discs 37 and clutch plate 32 against the plate 26 to thereby frictionally rotate the shaft 14 in the conventional manner.

Means will now be described whereby the clutch may be operatively released. Three studs 40 extend rearwardly from the plate 33 and on each stud a nut 41 is threaded. Three fingers 42 are pivotally mounted upon the plate 29, the inner ends of these fingers being positioned adjacent to the throw-out bearing 24 with their outer ends straddling the studs 40. Thus, when the inner ends of these fingers are simultaneously pushed forwardly they draw the studs 40 rearwardly against the action of the springs 39 thereby relieving the spring pressure upon the driven clutch discs to thereby disengage the clutch. Suitable springs 43 serve to prevent rattle between the fingers 42 and the cover 29.

A novel feature of my improved clutch comprises the throw-out ring which coacts with the bearing sleeve 24. As will be noted from Figure 2, a ring 44 is rotatably mounted upon the bearing 24, this ring having a babbitt coated liner 45 secured thereto. This liner is formed in part, as a sleeve which is pressed into the ring 44, the remainder of the liner comprising a disc which takes the thrust from the throw-out bearing. It will be noted that the ring 44 is provided with three pairs of spaced ears 46 which project forwardly therefrom with the inner end of each finger 42 disposed between one pair of ears. A notch is machined in each ear to form an annulus whereby a snap ring 47 may be sprung into position to retain the fingers against the ring 44. The liner 45 is prevented from rotating relative to the ring 44 by having portions thereof bent down between the ears, as shown in Figure 1.

Means are provided for reciprocating the throw-out member 24 which comprise an inverted U-shaped member 48 which is fixed upon a pivotally mounted shaft 49. The rear face of the member 24 is machined with a pair of flats 50 thereon against which the arms of the member 48 coact to both reciprocate and prevent rotation of same. A suitable spring 51 maintains the member 48 against the flats 50. Further, a pocket 52 is cast in the sleeve 24 which collects oil, the lubricant being conducted through an oil hole to the throw-out bearing surface to thus insure adequate lubrication for this surface at all times.

To assemble my clutch the driving plates and driven discs are secured in place and the fingers adjusted upon a dummy shaft and when the fingers are released then the clutch springs retain the plates in fixed alignment for shipping. To assemble this unit to the transmission shaft it is only necessary to insert the shaft into the hubs 38 and fix the bearing 16 in position. The clutch unit is then ready for insertion into the engine flywheel.

A feature of great importance in connection with this device is the fact that the end thrust is eliminated from the crankshaft. For this reason the engine designer is able to utilize a crankshaft capable of transmitting only the driving torque of the engine. In the device shown, the crankshaft 11 is formed as a plurality of axially aligned discs connected together by the several crank pins, the peripheries of the discs serving as main bearings for the shaft. One advantage of such construction is that the shaft may be inserted endwise into solid bearings in the engine, thus avoiding the necessity and expense of providing split-type bearings, as are required with the conventional crankshaft. However, as it is difficult to resist end thrust with this type of crankshaft, my improved clutch is especially adapted for use therewith, because in this case the crankshaft may float in its bearings with a minimum of resistance. It may be well to mention that pressure lubrication can conveniently be applied to a large main cylindrical bearing, while such pressure lubrication cannot be applied to a large thrust bearing. It is commercially impossible to maintain a tolerance sufficiently close in a thrust bearing when the thrust load is not applied, to prevent the unobstructed leakage of oil therefrom and thus cause a material drop in the oil pressure to the remainder of the engine bearings. For this reason it is possible to maintain a high speed large diameter cylindrical bearing while still being impossible to maintain such a diameter and speed in a thrust bearing.

It is believed that the applicant's clutch is the first structure wherein the axial end thrust resulting from disengaging the clutch is resisted solely by the transmission shaft and wherein this advantage is combined with a clutch wherein the operating fingers and relatively heavy clutch plates are connected to act as the driving plates of the clutch, the driven plates comprising only relatively light clutch discs. Thus, a selective gear type transmission may be used with this clutch without undue clashing of the gear teeth when the transmission is shifted. If desired, a conventional type of gear synchronizer may be readily installed in such selective gear transmission, this synchronizer preventing clashing of the gear teeth with very little manual exertion by the operator of the device.

Some changes may be made in the arrangement, construction, and combination of the various parts of my improved device without departing from the spirit of my invention and it is my intention to cover by my claims such changes as may reasonably be included within the scope thereof.

I claim as my invention:

1. A clutch especially adapted for use in vehicle engines having a flywheel driven by and fixedly secured to the crankshaft of said engine comprising, a driven shaft rotatably mounted in axial alignment with said flywheel, a clutch unit composed of a relatively heavy driving plate and a relatively light friction disc both mounted within said flywheel, said heavy plate being connected for positive rotation with said flywheel and said disc being connected to positively drive said shaft, a cover plate secured to said driving plate, a spring coacting with said cover plate resiliently clamping said driving plate and disc together, shiftable means for counteracting the pressure of said spring, said shiftable means producing an axial thrust on said heavy plate through the cover plate when holding the clutch disengaged, and a thrust bearing mounted against axial movement independently of said crankshaft or flywheel which coacts with said heavy plate and prevents axial movement of said clutch unit in the direction of said axial thrust.

2. A clutch, as claimed in claim 1, wherein said driven shaft is secured against axial movement independently of said crankshaft or flywheel and wherein said thrust bearing is fixedly secured upon said shaft.

3. A device, as claimed in claim 1, wherein a driving pin is secured in the rim of said flywheel which coacts with an axial slot formed in the relatively heavy plate member of said clutch unit, to thereby torsionally drive said clutch unit without restricting said unit against axial movement relative to said flywheel.

4. A device, as claimed in claim 1, wherein a rigid disc extends radially from said thrust bearing to the driving plate of said clutch, said disc being fixedly secured to both said bearing and plate to prevent axial movement of the clutch unit relative to said shaft in the direction of said axial thrust.

5. A device, as claimed in claim 1, wherein said shiftable means comprise a plurality of radially extending fingers which are mounted to rotate with said heavy plate and relative to said shaft when the clutch is disengaged.

6. A clutch especially adapted for use in connection with vehicle engines having a flywheel fixedly secured to the engine crankshaft so as to be driven thereby, a clutch ring non-rotatably and axially shiftably mounted in said flywheel, said ring having a clutch plate formed as part thereof, a driving plate non-rotatably and axially shiftably mounted in said ring, a relatively light clutch disc interposed between said driving plate and clutch plate, a cover plate secured to said ring, a plurality of springs interposed between said cover plate and said driving plate which resiliently clamps said clutch disc to frictionally drive same, a driven shaft rotatably mounted relative thereto and in axial alignment with said flywheel and secured against axial movement independently of said flywheel or crankshaft, said driven shaft being non-rotatably secured to said clutch disc, a thrust bearing fixedly secured against axial movement on said shaft, said bearing coacting with an extension on said clutch ring whereby axial movement of said ring relative to said shaft is resisted, and means mounted upon said cover plate and operable by an axially shiftable throw-out member to counteract said spring pressure.

7. An engine clutch for operatively coupling a driven shaft to the driving shaft of said engine comprising, a driving plate connected to said driving shaft for positive rotation therewith, a driven plate connected to said driven shaft for positive rotation therewith in at least one direction, means for clamping said plates together to effect said coupling, shiftable means mounted upon and rotating with said driving plate for counteracting said clamping means, said shiftable means producing an axial thrust on said driving plate when counteracting said clamping means, and a thrust bearing mounted against axial movement independently of said driving shaft, said thrust bearing coacting with said driving plate so as to prevent axial movement of the driving plate and driving shaft in the direction of said axial thrust.

8. A clutch, as claimed in claim 7, wherein said driving plate comprises a relatively heavy cast iron disc and wherein said driven plate comprises a relatively light disc faced with non-metallic friction material.

9. A clutch, as claimed in claim 7, wherein the connection between said driving plate and driving shaft and the connection between the driven plate and the driven shaft both permit relative axial movement between each plate and its associated shaft.

10. A clutch, as claimed in claim 7, wherein said clamping means comprises a plurality of coil springs mounted upon the driving member of the clutch.

11. An internal combustion engine clutch for operatively coupling a driven shaft to the crank shaft of said engine comprising, a relatively light weight friction disc axially, slidably mounted upon but connected to said driven shaft for positive rotation therewith, a pair of relatively heavy driving plates rotatably driven by the flywheel of said engine in position one on each side of said friction disc, a plurality of coil springs mounted for rotation with said driving plates in position urging the driving plates against the respective sides of said friction disc to thereby affect the clutch in action, operative shifting means mounted for rotation with said driving plates for compressing said springs to thereby disengage the clutch, said shifting means producing an axial thrust on the driving plates, and a thrust bearing fixedly mounted upon said driven shaft, said thrust bearing coacting with one of the driving plates so as to prevent axial movement of said plate in the direction of said axial thrust.

12. An engine clutch, as claimed in claim 11, wherein both the driving plates and the driven plate are housed within the flywheel of said engine.

13. An engine clutch, as claimed in claim 11, wherein relative axial movement is permitted between the engine flywheel and both of said driving plates.

HENRY FORD.